June 18, 1968 T. E. NOAKES 3,388,864
CARTRIDGE TYPE EXPANSION VALVE
Filed Sept. 23, 1966 2 Sheets-Sheet 1
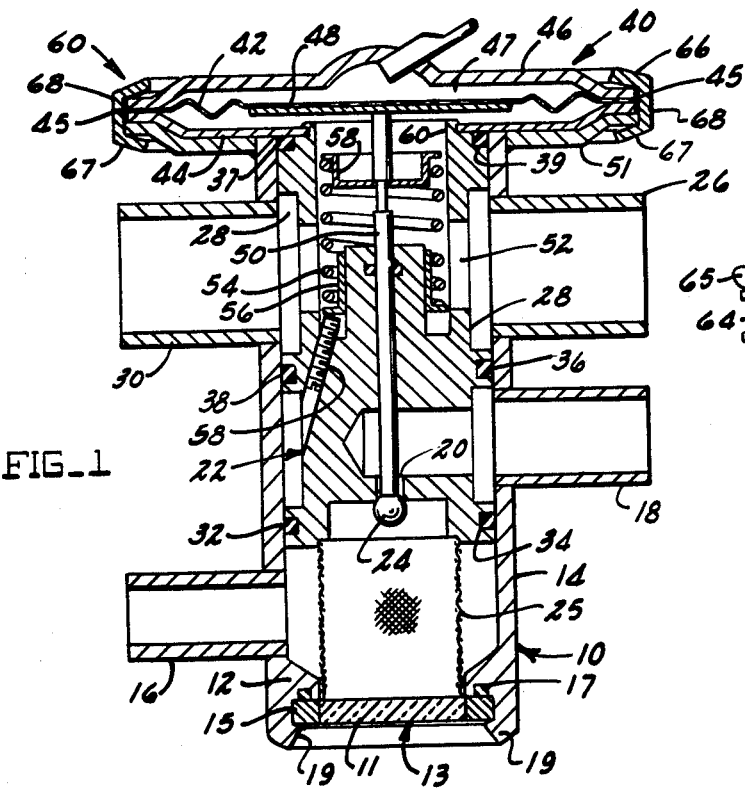
FIG_1
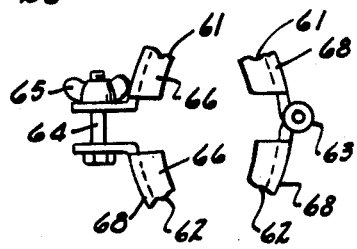
FIG_2
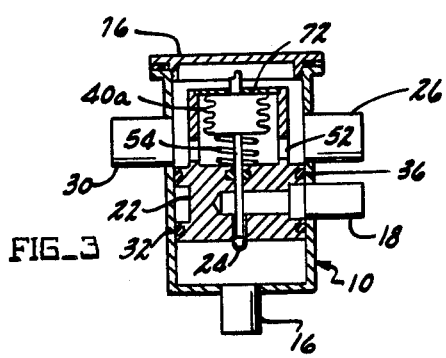
FIG_3
INVENTOR.
THOMAS E. NOAKES
BY TENNES I. ERSTAD
JOHN E. McRAE
ATTORNEYS

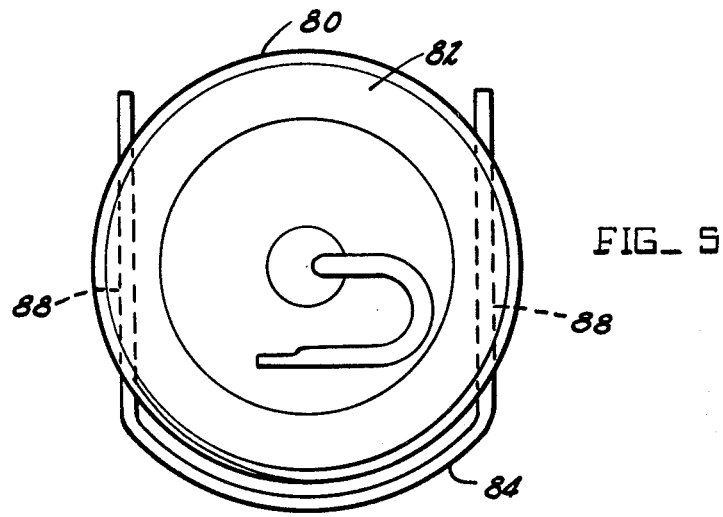
FIG_5
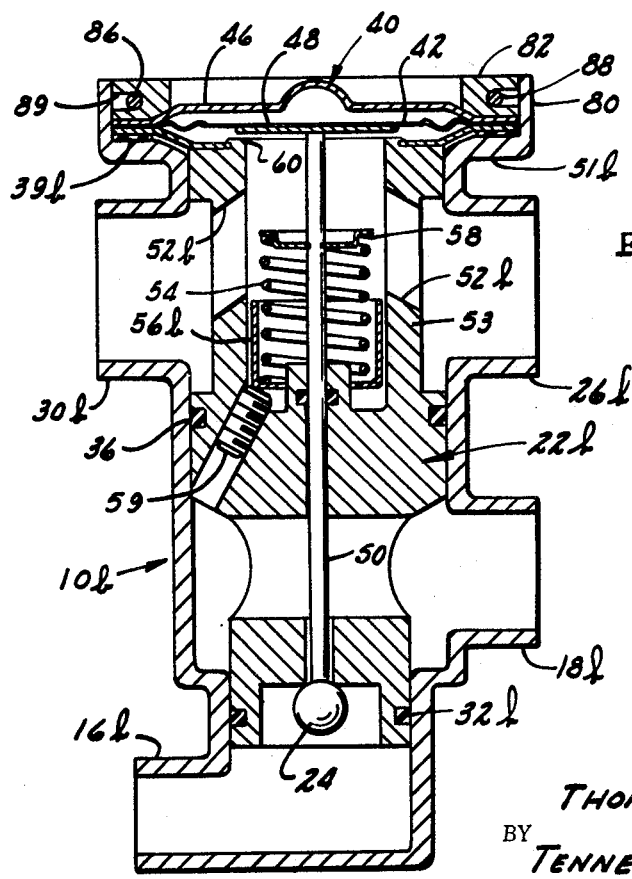
FIG_4
INVENTOR.
THOMAS E. NOAKES
BY TENNES I. ERSTAD
JOHN E. McRAE
ATTORNEYS

United States Patent Office 3,388,864
Patented June 18, 1968

3,388,864
CARTRIDGE TYPE EXPANSION VALVE
Thomas E. Noakes, 17201 Westmoreland,
Detroit, Mich. 48219
Filed Sept. 23, 1966, Ser. No. 581,578
13 Claims. (Cl. 236—92)

This invention relates to a thermostatic expansion valve of the type shown in U.S. Patent 2,642,724. That patent shows an expansion valve wherein the inlet and outlet fittings are connected with a housing which is separate from the internal valve structure used to control the refrigerant flow. This enables the housing to be soldered into the fluid system without heating or damaging the internal valve structure. The internal valve control structure can be formed as a separate cartridge and inserted into the housing after the housing has been soldered into the refrigerant system. Repair or replacement of the cartridge can be accomplished without disturbing the housing.

One object of the present invention is to provide a cartridge type expansion valve in which tolerance build-ups are not effective to prevent fluid tight assembly of the cartridge in the housing.

Another object is to provide a cartridge type expansion valve comprising a plug-like valve body and diaphragm type thermostatic power element, said valve body being slidably insertable into a housing structure, and the power element taking a position outside the housing structure. This enables a large power element to be used with a relatively small valve body plug, thereby economizing on materials and machining costs.

A further object is to provide a cartridge type expansion valve which accommodates a strainer and sight glass therein.

In the drawings:

FIG. 1 is a sectional view taken through an expansion valve constructed according to the invention.

FIG. 2 is a fragmentary view of a clamp used in the FIG. 1 embodiment.

FIG. 3 is a sectional view taken through a second embodiment of the invention.

FIG. 4 is a sectional view taken through a third embodiment of the invention.

FIG. 5 is a top plan view of the FIG. 4 embodiment.

General arrangement

As shown in FIG. 1, the invention comprises an expansion valve having a hollow tubular housing 10 formed with an open lower end wall 12 and a cylindrical side wall 14. The opening in wall 12 is closed by a sight glass or inspection window 13 comprised of a transparent glass disc 11 fused into a steel ring 15. Retention of the window against an O-ring seal 17 is effected by a staked over portion 19 of housing 10.

Extending outwardly from housing sidewall 14 is a high pressure liquid inlet conduit 16 adapted to be connected to the condenser or receiver of a conventional refrigeration system. A liquid outlet fitting 18 extends outwardly from housing sidewall 14 for connection with a conventional evaporator (not shown). Inlet 16 and outlet 18 are connected fluidwise by a fluid flow port 20 formed in a plug type valve body 22. When spherical valve element 24 is in an open position liquid refrigerant can flow from conduit 16, through port 20 and conduit 18 to the evaporator. It will be understood that the liquid flow through the valve could be reversed, i.e., fitting 18 could serve as the inlet and fitting 16 as the outlet.

In the illustrated arrangement a cylindrical open-ended strainer screen 25 is interposed between inlet 16 and port 20 to prevent solid contaminants from plugging the port 20 and obstructing valve element 24. The screen may be retained in place by confining counterbores machined or otherwise formed in housing end wall 12 and plug body 22.

After passage through screen 25 and port 20 the refrigerant flows into the evaporator, where it vaporizes in the usual manner. The super heated gas or vapor exhausted from the evaporator is directed to a low pressure vapor inlet conduit 26 which is suitably mounted in housing sidewall 14. As shown in the drawing, valve body 22 is provided with an annular peripheral recess 28 for allowing vapor from conduit 26 to pass around the outside of valve body 22 and through a tubular vapor outlet conduit 30 suitably secured to housing sidewall 14. Conduit 30 is adapted to be connected to the inlet of a conventional compressor (not shown). The complete refrigerant circuit comprises the compressor, condenser, inlet fitting 16, port 20, outlet fitting 18, the evaporator, vapor inlet fitting 26, vapor outlet fitting 30, and the suction line leading back to the compressor.

Valve control structure 22, 40

The valve control structure takes the form of a cartridge consisting of valve body plug 22 and thermostatic power element 40. Element 40 comprises a vertically movable metallic diaphragm 42 sandwiched between two rigid dished metal plates 44 and 46; the parts are sealed together by a peripheral weld 45. Diaphragm 42 and plate 46 cooperate to form a container 47 which is precharged with a suitable quantity of a volatile liquid, which may be the same material as the refrigerant used in the system. The lower face of diaphragm 42 is adhered to a conventional pad 48 which transmits diaphragm movement to a force-transmitting rod 50, the lower end of which is welded to a spherical valve element 24.

At a suitable thermal loading of the evaporator all of the liquid refrigerant supplied through fitting 18 will be evaporated in the coil so that the fluid flowing out of the evaporator is completely vaporized. The vapor will increase in temperature and have a predetermined superheat as it flows into the annular recess 28 surrounding valve body 22. Some of the vapor will flow through port 52 and reach the underside of diaphragm 42. The vapor will thus heat the charge in container 47, and thermal expansion of the charge will thereupon move the diaphragm downwardly to further open valve element 24.

The supply of liquid refrigerant through fitting 18 will thus increase, thereby increasing the amount of liquid being vaporized in the evaporator and reducing the amount of superheat in the vapor flowing through port 52. The resultant temperature decrease adjacent the underside of diaphragm 42 will effect a thermal contraction of the charge in container 47 and will permit compression coil spring 54 to move the diaphragm upwardly, thus tending to close the spherical valve element 24. In this manner the valve structure will provide a substantially constant superheat irrespective of the load on the evaporator coil.

The superheat setting may be varied by adjusting the loading on spring 54. For this purpose there is provided an annular spring seat 56 adjustable vertically by means of a factory-set screw 58. The force of the spring may be applied to the push rod 50 and diaphragm 42 through an annular spring seat 58 engaged with a shoulder on rod 50.

Housing 10

Housing 10 comprises the aforementioned tubular structure 14 having its lower end closed by the inspection window 13. The upper end of the housing structure is welded to or otherwise affixed to an outwardly radiating plate 51 which may conform to the contour of dished plate 44. Plate 51 thus forms a nest or seat for power element 40 when the plug 22-power element 40 assembly is installed into housing 10. Plate 51 has no permanent connection with plate 44, and the valve control structure can therefore be removed from housing 10 if necessary.

*Assembling the valve control structure into housing 10*

In this invention the plug type valve body 22 and power element 40 are rigidly secured together separately from housing 10, as by staking the annular protruding portion 60 of the plug body onto the power element plate 44. This staking operation can be performed prior to welding the power element parts together. The staking need not form a fluid tight seal; therefore it can be performed very economically.

After assembly of plug body 22 and power element 40, the plug body can be equipped with three O-ring seals 32, 36 and 37 disposed in respective ones of peripheral grooves 34, 38 and 39. The plug body can then be slid into cylindrical housing 10 so that seal 37 seals against plate 44 and side wall 14. Seal 32 seals against wall 14 to prevent liquid refrigerant from bypassing port 20. Seal 36 seals against wall 14 to prevent liquid from bypassing the evaporator and moving directly into vapor passage 28.

Retention of the valve control cartridge in housing 10 may be accomplished by an annular ring-like clamp 60 split into two semi-circular sections 61 and 62 (see FIG. 2). A hinge 63 interconnects the sections at one end, and a bolt-wing nut assembly 64, 65 interconnects the sections at their other end. In cross section the semi-circular sections 61 and 62 are each configured as channels having a web 68 and two legs 66 and 67. These legs diverge slightly as they proceed from web 68. The clamp assembly 60 may first be loosely positioned around the periphery of power element 40. By tightening down on wing nut 65 the two sections 61 and 62 may be drawn toward one another, thus causing the divergent legs 66 and 67 to exert a light clamping action against plates 46 and 51. In this manner the cartridges 22, 40 may be retained in place on housing 10. Removal of the cartridge may be effected by first unloosening clamp 60.

*FIG. 3 embodiment*

The FIG. 3 embodiment uses a metallic bellows power element 40a secured to a plate 72 suitably mounted in a countersink in the valve body 22. The upper end of the valve housing 10 may be closed by a cover 76, thus confining the vapor flow to the space surrounding power element 40a. The operation and function of the FIG. 3 embodiment are similar to the FIG. 1 embodiment.

*FIG. 4 embodiment*

This embodiment utilizes a housing 10b wherein the four tubular fittings 16b, 18b, 26b, and 30b are formed as integral protrusions from the housing side wall 14b. Seating wall 51b is also formed as an integral part of the housing. This wall may be extended axially, as at 80, to form a peripheral confining wall for a clamping ring 82.

Formation of the one-piece housing 10b is believed possible by first drawing the cup-like configuration (walls 14b, 51b and 80) from a slug of metal. Protrusions 16b, 18b, 26b, and 30b can probably be formed by hydraulic pressure, as by placing the cup-like housing within the cavity of a hydraulic forming apparatus and applying hydraulic pressure to the housing interior so as to flare out the four tubular wall portions which define the fittings. The die cavity in the hydraulic apparatus would of course be contoured to the outline of the protrusions. The openings in the outer ends of the four protrusions would have to be formed after the hydraulic forming operation, since this operation depends on a closed or sealed work piece for containment of the hydraulic pressure. The openings in the protrusions could be formed by shearing or drilling the ends of the protrusions.

In the FIG. 4 embodiment the joint between power element 40 and housing 10b is provided by an annular seal 39b, which may be an elastomeric element or a ring of thermoplastic sealant material. In the latter case the cartridge would not be removable from the housing; other advantages of the invention would however be retained.

Retention of the FIG. 4 cartridge in the housing is accomplished by clamping ring 82 held down by a hairpin type lock element 84 having two rod-like portions 86 and 88 going through openings in peripheral wall 80 and across the outline of ring 82. Grooves 89 may be provided in the edge of ring 82 to accommodate rod-like portions 86 and 88.

The FIG. 4 device differs from the FIG. 1 embodiment slightly in respect to the inclination of openings 52b in the sleeve-like portion 53 of the valve body plug 22b. This inclination may have some slight advantages in guiding the refrigerant vapor across the lower face of diaphragm 42. In the FIG. 4 arrangement the lower spring seat element 56b is cup-shaped for guidance by the internal surface of sleeve portion 53; otherwise the superheat adjustment is as shown in FIG. 1.

Preferably the O-ring seal 38 between the liquid passage and vapor passage should be fairly tight even after extended surface. Therefore the fit between plug 22b and the housing sidewall may be fairly close. To minimize frictional resistances during insertion of the plug into the housing the plug may be formed with a reduced diameter at its lower end. This allows seal 32b and the confining portion of the plug to remain clear of the housing side wall until just before the seal reaches its final position.

It will be seen that the various embodiments contain certain interchangeable features. Thus, the integral fitting feature of FIG. 4 can be employed in the structure of FIGS. 1 or 3. Likewise the cartridge retention mechanis of FIG. 1 can be employed in a modification of the FIG. 4 device.

*Advantages of the invention*

A principal advantage is the fact that all of the fittings 16, 18, 26 and 30 are connected with housing 10. The housing contains no parts which would be damaged by heat; the heat-destructible parts such as power element are separate from housing 10. Therefore the housing can be soldered into the refrigerant system with the heat-destructible parts not yet inserted into the housing.

It will also be noted that seals 32 and 36 are of the O-ring type which do not require a multiplicity of tolerances dependent on one another for fluid tight joints. Thus, the seals do not work against radial shoulders which would cause leaky joints unless accurately spaced along the housing length. In the illustrated arrangement the diameters of plug 22 and housing 10 can be readily held within close limits, and there is no tolerance build-up problem which might occur with gasket type seals operating against radial shoulders.

The FIG. 1 embodiment advantageously includes a relatively large power element 40 and a relatively small diameter housing 10 and plug 22. The size relation is made possible by the fact that the power element is disposed outside the fluid cavity defined by the housing, but still in thermal engagement with the refrigerant vapor. The size relationship is such as to minimize the amount of brass or aluminum required without making the passages too small or the power element too weak in terms of push rod force.

The design of FIG. 1 utilizes a rubber seal 37 for sealing the joint between power element 40 and housing 10. Previous designs have usually relied on a solder joint between the power element and housing for sealing purposes. Because of its location such a joint was difficult to seal, and in any event required the use of brass as the valve body material. In the illustrated designs valve body 22 has no solder connection with the power element; hence the valve body can be formed of low cost aluminum instead of the more costly brass. The FIG. 1 power element is preferably formed of stainless steel, as under conventional practice.

It will be noted that the FIG. 1 design incorporates a removable strainer screen 25 and inspection window 13. The location of this window is especially important in that it permits a view of the liquid refrigerant and valve element 24. Any bubbles in the refrigerant will be visible through the window and will indicate the need for adding refrigerant to the system. The valve element may be seen during operation and its movement or lack thereof noted under operational conditions. Lack of valve element movement will indicate an improperly charged or leaky power element. Failure of the valve element to close may be detected by noting the presence of dirt, ice, or sediment on the valve seat.

The strainer screen is of the annular type, thus providing a relatively large screen area for the available chamber volume. Additionally, the annular nature of the screen prevents it from interrupting a view of the valve element through the inspection window.

It will be appreciated that the drawings are illustrative and that some changes can be made without departing from the spirit of the invention as comprehended by the claims.

It is claimed:

1. A refrigerant expansion valve comprising a hollow tubular housing defining a cavity; said housing having a high pressure liquid inlet opening, a liquid outlet opening, a low pressure vapor inlet opening, and a vapor outlet opening; a cartridge formed separately from said housing; said cartridge comprising valve body means disposed within the cavity, and a thermostatic power element carried thereon; said power element comprising a container having an expansion charge therein, said container having a movable wall exposed to the vapor flowing from the vapor inlet to the vapor outlet whereby the charge produces movement of the movable wall in accordance with the vapor temperature and pressure; said valve body means having a flow port operatively disposed between the liquid inlet opening and liquid outlet opening; a valve element movable toward and away from the port to control liquid flow therethrough; and force-transmitting means between the movable wall of the power element and the valve element, whereby the position of the valve element is determined by the temperature-pressure relationship of the charge and the media flowing from the vapor inlet opening to the vapor outlet opening; said valve body means comprising a plug slidably insertable into the tubular housing to nest against the housing side wall; said plug having a first peripheral groove interposed between the liquid inlet opening and liquid outlet opening; a first elastomeric sealing element disposed in said first groove to seal against the housing side wall, thereby precluding liquid bypass around the control port; said plug having a second peripheral groove interposed between the two liquid openings and two vapor openings; and a second annular elastomeric sealing element disposed in said second groove to seal against the housing side wall, thereby precluding liquid bypass into the vapor passage formed between the two vapor openings.

2. The expansion valve of claim 1 wherein the power element comprises a pair of rigid dished plates and an interposed diaphragm having its peripheral edge area adhered to said plates, said diaphragm constituting the aforementioned movable wall; the aforementioned plug having an annular wall structure protruding through a central opening in one of the dished plates, the terminal area of said wall structure being staked over the face of said one plate to secure the valve body means and power element together.

3. The expansion valve of claim 2 wherein the power element has a diameter appreciably larger than the diameter of the tubular housing; said power element being located outside of the cavity defined by the housing.

4. The expansion valve of claim 2 wherein the plug has a third peripheral groove disposed adjacent the protruding wall structure; and a third annular elastomeric sealing element disposed in said third groove to seal against the housing side wall and said one plate.

5. The expansion valve of claim 1 wherein the first and second sealing elements have the same outer diameter.

6. A refrigerant expansion valve comprising a hollow tubular housing defining a cavity; said housing having a high pressure liquid inlet opening, a liquid outlet opening, a low pressure vapor inlet opening, and a vapor outlet opening; a cartridge formed separately from said housing; said cartridge comprising valve body means disposed within the cavity, and a thermostatic power element carried thereon; said power element comprising a container having an expansion charge therein, said container having a movable wall exposed to the vapor flowing from the vapor inlet to the vapor outlet whereby the charge produces movement of the movable wall in accordance with the vapor temperature and pressure; said valve body means having a flow port operatively disposed between the liquid inlet opening and liquid outlet opening; a valve element movable toward and away from the port to control liquid flow therethrough; and force-transmitting means between the movable wall of the power element and the valve element, whereby the position of the valve element is determined by the temperature-pressure relationship of the charge and the media flowing from the vapor inlet opening to the vapor outlet opening; said valve body means comprising a plug slidably insertable into the tubular housing to nest against the housing side wall; and an inspection window located in the tubular housing and forming part of the wall structure which defines the inlet chamber, said window being arranged to afford a visual indication of insufficient refrigerant charge or improper operation of the valve element.

7. The valve of claim 6 wherein the inspection window is located in the end of the tubular housing in a position facing the valve body plug; and a strainer located within the inlet chamber to intercept refrigerant flowing from the liquid inlet opening to the flow port.

8. The valve of claim 7 wherein the strainer is an annular porous element concentric with the flow port and inspection window, whereby the valve element is viewed through the space circumscribed by the strainer.

9. The valve of claim 8 wherein the annular strainer element is a removable element spanning the entire space between the valve body plug and inspection window; said plug and window engaging opposite ends of the strainer element to retain same in an operative position interposed between the inlet opening and flow port.

10. A refrigerant expansion valve comprising a hollow tubular housing defining a cavity; said housing having four fittings formed as integral protrusions of the housing side wall; one of said protrusions forming a high pressure liquid inlet opening, a second of said protrusions forming a liquid outlet opening, a third of said protrusions forming a low pressure vapor inlet opening, and the fourth protrusion forming a vapor outlet opening; a cartridge formed separately from said housing; said cartridge comprising a plug-like valve body disposed within the cavity, and a thermostatic power element carried thereon; said power element comprising a container having an expansion charge therein, said container including a movable wall exposed to the vapor flowing from the vapor inlet to the vapor outlet whereby the charge produces movement of the movable wall in accordance with the vapor temperature and pressure; said valve body having a flow port operatively disposed between the liquid inlet opening and liquid outlet opening; a valve element movable toward and away from the port to control liquid flow therethrough; and force-transmitting means between the movable wall and valve element, whereby the position of the valve element is determined by the temperature-pressure relationship of the charge and the media flowing from the vapor inlet opening to the vapor outlet opening; said valve body comprising a plug slidably insertable into the tubular housing to nest within the housing side wall in fluid-sealing relation.

11. A refrigerant expansion valve comprising a hollow tubular housing of cup-like configuration defining a cavity; said housing having a high pressure liquid inlet opening in its side wall, a second liquid outlet opening in its side wall, a low pressure refrigerant vapor inlet opening in its side wall, and a vapor outlet opening in its side wall, said vapor opening being located in substantially the same raidal plane and adjacent the mouth of the tubular housing; the mouth portion of said housing including a generally outwardly radiating wall forming an annular seating surface; a cartridge formed separately from said housing; said cartridge comprising a plug-like valve body disposed within the housing cavity, and a thermostatic power element carried on said power element being seated on the aforementioned seating surface; said plug-like valve body having a central main body portion engaging a central part of the housing internal surface to isolate the liquid openings from the vapor openings, and a sleeve extending from the central main body portion toward the mouth of the housing; said thermostatic power element comprising a first annular dished plate having its central area seated on an end area of the aforementioned sleeve and secured thereto, a second dished plate protruding away from the first plate, a diaphragm having its peripheral edge area sandwiched between the peripheral edge portions of the two plates to define a closed chamber between the diaphragm and central portion of the second dished plate, and a charge of thermally expansible material disposed within the chamber to effect movement of the diaphragm in accordance with the temperature-pressure relationship of the charge; said valve body sleeve having openings therein to admit refrigerant vapor to the space between the first dished plate and diaphragm whereby the temperature-pressure condition of the refrigerant is transmitted to the charge; said plug-like valve body having a valve seat in the end thereof remote from the sleeve, and flow passages connected with said seat for conducting liquid from the liquid inlet opening across the seat to the liquid outlet opening; a valve element arranged for movement toward and away from the seat to control liquid flow therethrough, and a movable thrust rod extending through the valve body plug between the valve element and diaphragm to translate diaphragm movement into valve element movement.

12. The expansion valve of claim 11 and further comprising adjustable means opposing expansive movement of the diaphragm, said adjustable means comprising a first spring seat carried by the thrust rod in the space within the valve body sleeve, a second spring seat floatably positioned within the space defined by the valve body sleeve, a coil type compression spring trained between said seats, and an abutment screw threaded into the valve body to engage the face of the second spring seat remote from the spring, said abutment having an axial component of motion for varying the axial position of the second spring seat.

13. The expansion valve of claim 11 and further comprising means for retaining the cartridge within the housing, said retaining means comprising a peripheral wall extending axially from the aforementioned seating surface, an annular clamping ring disposed within said peripheral wall in engagement with the peripheral portion of the second dished plate, and a plurality of locking elements extending through openings in the peripheral wall and across the outline of the clamping ring to lock said ring in place.

References Cited
UNITED STATES PATENTS

| | | | |
|---|---|---|---|
| 2,520,191 | 8/1950 | Aughey | 62—225 |
| 2,596,036 | 5/1952 | MacDougall | 62—225 |
| 3,139,903 | 7/1964 | Lonn | 62—225 |

MEYER PERLIN, *Assistant Examiner.*